(12) United States Patent
Willen

(10) Patent No.: US 6,334,741 B1
(45) Date of Patent: Jan. 1, 2002

(54) ROTARY TURNING ATTACHMENT EQUIPPED WITH AT LEAST TWO TOOLS

(75) Inventor: Charles Gérard Willen, Villeneuve (CH)

(73) Assignee: Septa Research (Ontario) Inc., Ontario (CA)

( * ) Notice: Subject to any disclaimer, the term of this patent is extended or adjusted under 35 U.S.C. 154(b) by 0 days.

(21) Appl. No.: 09/508,288

(22) PCT Filed: Aug. 28, 1998

(86) PCT No.: PCT/EP98/05706

§ 371 Date: Mar. 6, 2000

§ 102(e) Date: Mar. 6, 2000

(87) PCT Pub. No.: WO99/12684

PCT Pub. Date: Mar. 18, 1999

(30) Foreign Application Priority Data

Sep. 8, 1997 (CH) ............................................. 2101/97

(51) Int. Cl.[7] .............................. B23B 27/00; B26D 1/00
(52) U.S. Cl. .............................. 407/36; 407/45; 407/37; 407/78
(58) Field of Search ............................... 407/36, 37, 38, 407/39, 40, 44, 45, 73, 74, 75, 76, 77, 78, 79

(56) References Cited

U.S. PATENT DOCUMENTS

| 3,516,134 A | * | 6/1970 | Heuser ........................ 407/37 |
| 3,518,738 A | * | 7/1970 | Porter ......................... 407/74 |
| 4,043,697 A | | 8/1977 | Eckle |
| 4,101,239 A | * | 7/1978 | Wohlhaupter ............... 408/182 |
| 4,592,399 A | * | 6/1986 | Rhodes ...................... 407/38 X |
| 4,592,680 A | * | 6/1986 | Lindsay ....................... 407/36 |
| 4,761,103 A | * | 8/1988 | Krstovic .................. 407/45 X |

FOREIGN PATENT DOCUMENTS

| DE | 1034455B A | 7/1958 |
| DE | 2746232 A | 4/1979 |
| DE | 3920969 A | 1/1991 |
| DE | 195 03 486 A | 8/1996 |
| FR | 1 407 886 A | 11/1965 |
| FR | 2 319 447 A | 2/1977 |

* cited by examiner

Primary Examiner—Henry Tsai
(74) Attorney, Agent, or Firm—Bugnion S.A.; John Moetteli

(57) ABSTRACT

The invention concerns an attachment (1) comprising a radial sliding track (103) for each slide (2), recessed in the attachment body. Two semicircular plates (4, 5) maintain the slides in the sliding track (103) and guide them. The slides are locked by screws (18, 19) operating by deforming the corresponding semicircular plate (4, 5). The displacement of a slide is obtained by a micrometric screw (12) operating on a nut integral with the slide.

12 Claims, 3 Drawing Sheets

ROTARY TURNING ATTACHMENT EQUIPPED WITH AT LEAST TWO TOOLS

The present invention relates to a rotary turning attachment with at least two tools, comprising a cylindrical body designed to be mounted on the spindle of a machine tool, at least two slides designed to move radially with respect to the axis of rotation of the body, each of the slides being secured to a removable tool holder.

The present invention relates more particularly to cylindrical turning attachments equipped with interchangeable tip holders for standard ISO tips. These attachments are intended for the spindles of transfer machines and special machines. For many years, this type of machine has been suited only to the mass production of parts that can be machined relatively easily. The increasingly stringent demands for precision and productivity, the constant efforts to reduce production costs and the considerable advances made in cutting tips means that it can now be envisaged for these machines to be used for moderate or even short production runs, and materials which are more difficult to machine. Production changes are far more frequent. It is thus necessary to drastically reduce the unproductive time by reducing the setting time, which is still relatively lengthy. Often, the machining of a difficult material and tight tolerances entail frequent interventions to make microadjustments or change the cutting tools or tips.

Most manufacturers of transfer machines have their own system of tooling and the users have barely any choice and have to tolerate the inconveniences of this situation. Often too, the very restricted amount of space available limits the use of standardized conventional or quick-change tool holders.

There is a real need for improvement and rationalization; even though users are doing the best that they can, they are still, however, waiting for rational tooling that meets their needs.

The object of the present invention is to propose a very compact rotary turning attachment which is suited to customary and standardized machine-tool spindles. Thus, for example, in the case of the attachment set out according to the invention, the outside diameter is 42, 50, 63 or 83 mm with a working diameter between the cutting edges of the tips that can vary between 2 and 48 mm. Larger attachments are obviously also feasible.

The rotary attachment according to the invention is one wherein the cylindrical body comprises, on one plane face, one slideway per slide, formed in a recess running along a radius of said plane face and designed to allow the slide to move; at least two plates are attached removably to said face of the body, so as to hold the slides in the respective slideway in the direction of the axis of rotation of the turning attachment; said attachment comprises at least two housings, each running from the lateral surface of the cylindrical body inward, parallel to said slideway, said cylindrical housings being designed to take the micrometer screws each of which controls the individual movement of one slide; and said cylindrical housings each open into a housing of larger dimensions communicating with the corresponding slideway, the latter housing allowing a nut secured to a slide to be housed and moved therein, the threaded part of a micrometer screw being engaged in said nut.

The advantage of this turning attachment is that in spite of its small size, its relatively small volume is able to house means which allow the movement of the cutting tools to be set precisely.

According to one alternative form, when the need is there and depending on the diameter of the attachment, a concentric bore allows a cutting tool to be attached coaxially with a screw arranged radially in the body.

Upward of a certain size, a taper nut can be housed at the center and, in collaboration with a taper collet placed directly in the spindle of the machine on which the attachment is mounted, allows a tool to be attached coaxially using standardized double taper collet chucks (DIN 6499) or the like.

According to another alternative form, the slide is locked by the deformation of the plates using a binding screw acting on the part of the slide located in the slideway, the deformation being facilitated by an appropriate clearance in the face of the body under each semicircular plate. The plates may also be locally thinned in order to adapt their flexibility.

According to another alternative form, the micrometer screws controlling the movement of the slide are held in place by pins engaged in a groove near to the head of the corresponding screw.

According to another alternative form, the slides are designed also to allow axial adjustment of the tool supported by a tool holder.

As a preference, the slides are equipped with a toothed face facing axially so that interchangeable tool holders equipped with an oblong opening running axially and allowing the attachment member to pass can be attached thereto.

According to a preferred alternative form, the tool holder is equipped with an axial adjustment member which moves parallel to the direction of adjustment, pressing against a surface of the slide perpendicular to said direction of travel.

As a preference, the attachment member and the axial adjustment member are, on the one hand, an attachment screw and, on the other hand, a self-locking thrust screw incorporated into the tool holder.

It is obvious that a key or mutual nesting of the two flat faces of the slide and of the tool holder may just as easily constitute axial guidance for adjustment and positioning. However, to produce this short and rigid construction in a very tight space without reducing the ability of the slide and of the tool holders to withstand the cutting forces, the risks of vibration and centrifugal force at high speed, it has proved necessary to keep carefully sited ribs which keep the cross section of the two components high enough.

What is more, the axial adjustment thrust screw is incorporated into the tool holders at a suitable location so that by butting against the slide it contributes to the rigidity of the two elements assembled. Another special feature of this construction automatically allows the thrust screw to press firmly in the axial direction against the slide as the tool holders are clamped. Specifically, in an alternative form, the face of the tool holders on which the head of the attachment screw acts is inclined slightly so that by turning it to the right to lock it, the face of the head of the screw preferably acts on the side via which this generates a resulting force which also axially presses the tool holder against the slide via the axial adjustment thrust screw. This characteristic therefore additionally provides an increase in rigidity, an improvement in the precision of the axial adjustment while eliminating any risk of slight backward movement of the tool holder with respect to the slide while it is being locked by the transverse attachment screw. The latter can protrude beyond the slide and thus be fitted with an additional safety nut, depending on the dimensions of the attachment, of course.

These novel particular features of the construction of these attachments offer ease of adjustment and at the same time machining performance which are unique to attachments as compact as this with such a capability. Such attachments have a working capability of a maximum diameter of 48 mm for an attachment outside diameter of 83 or a capability of 22 mm diameter for an outside diameter of 52 mm, for example.

The invention will be described in further detail with the aid of the appended drawing which illustrates one embodiment according to the invention.

Figure 1:
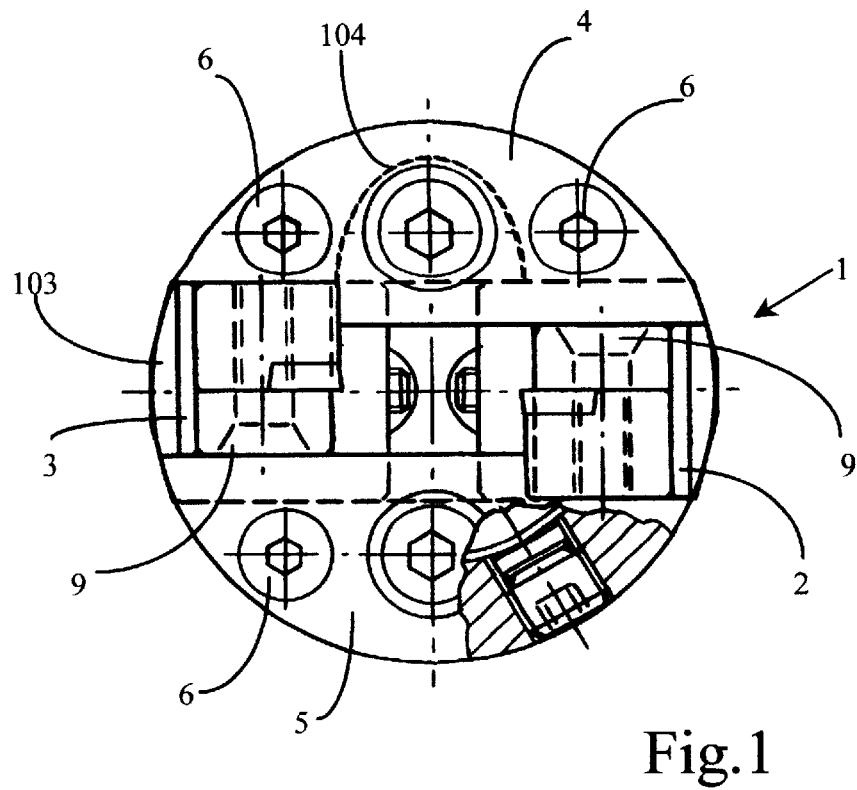
FIG. 1 is a view from beneath of the turning attachment with two slides.
Figure 2:
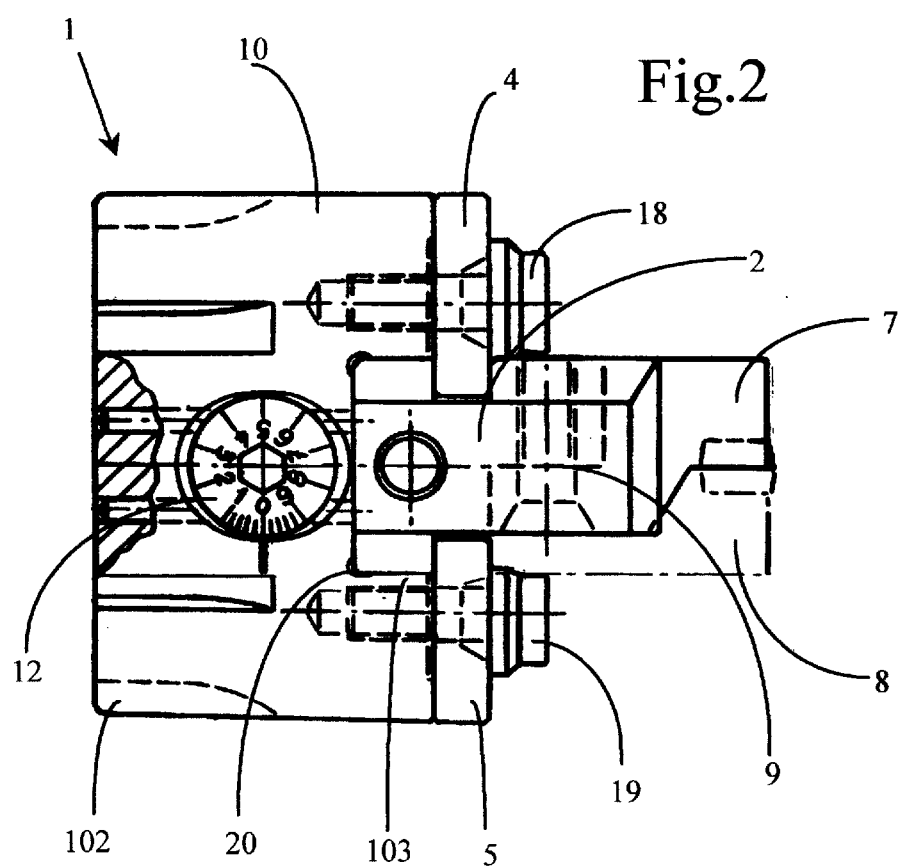
FIG. 2 is a side view of the same attachment.

The turning attachment comprises a body 1 formed of a cylindrical part 10 with, at one end, a bore 101 equipped with means for assembling the attachment with the spindle of the machine tool. Means 102 allow it to be grasped in a tightening tool, while on the other face, two essentially rectangular recesses stretch along one diameter of the face of the cylinder forming a slideway 103 inside which two slides 2 and 3 slide.

If the turning attachment were to have other slides, the slideways would extend out symmetrically from the center of the attachment.

The face with the slideway 103 is equipped with two semicircular cover plates 4 and 5 partially covering the slideway 103 to allow the slides 2 and 3 to be held in the axial direction. The plates 4 and 5 are screwed to the attachment 10 by screws 6 once the slides 2 and 3 have been fitted.

In the case of an attachment with four slides, four plates would be used, each plate acting on two slides.

Figure 4:
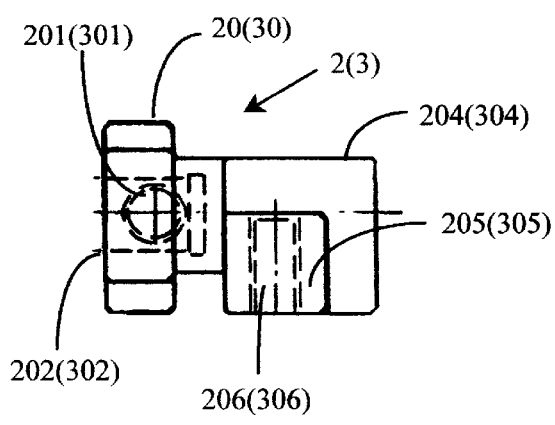
FIG. 4 is a side view of the slide.
Figure 6:
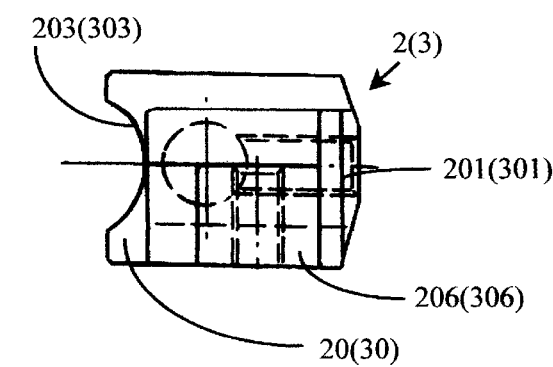
FIG. 6 is a view from the right of FIG. 4.
Figure 5:
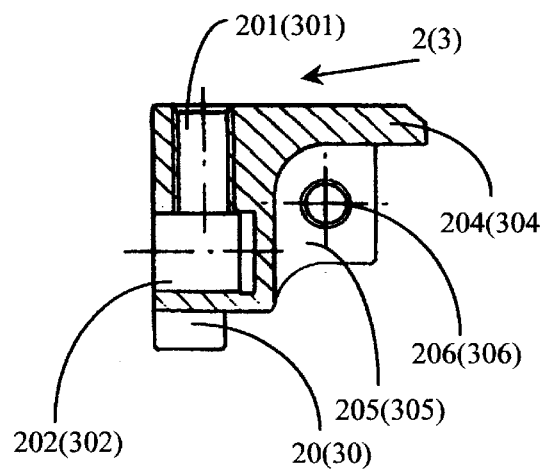
FIG. 5 is a side view rotated through 90° with respect to FIG. 4 and partly in section.

We shall now describe the slides with the aid of FIGS. 4 to 6. We shall confine ourselves to a description of the slide 2 and, between parentheses, on said figures, we have indicated the references of the second slide 3. The slide 2 comprises a head 20 of rectangular shape, the dimensions of which allow it to fit in the slideway 103 in the attachment 10 of the cylindrical body. The head 20 (see FIG. 5) has two perpendicular housings 201 and 202. The first is tapped and is able to house a screw 20 intended to lock a nut 21 in the housing 202. When the attachment is one whose body 1 has an additional bore concentric with the axis for housing a tool, that face of the head of the slide which faces toward the axis of the attachment has a rounded clearance 203 (FIG. 6) in order to increase the possible travel of the slide.

The slide has a projection for retaining the tool holders, and this projection consists of a part of a certain thickness in the shape of a L 204 and a second part 205 of lesser thickness in which a tapping 206 allows a screw 9 to be used to attach a tool holder 7, or 8. In theory, the tool holder bears tips 71, or 81. The individual movement of each slide is achieved by a micrometer screw 12, or 13, equipped with a groove 121 and with a threaded screw body 123 fixed in a housing 14, or 15. The housings 14 and 15 are arranged symmetrically with respect to the axis of rotation of the body 10 and stretch from the lateral surface of the cylindrical body toward the center and end in a housing of a larger size 16, or 17. These housings 16 and 17 are in communication with the slideway 103 over a certain length to allow the nut 21, or 31, to pass and move while the position of the respective slide is being set.

Each micrometer screw 12, or 13, is fixed in said housing by means of two pins G which engage in the respective grooves 121 and 131.

To achieve the best operation, the attachment may be assembled as follows: first of all, the nuts 21, 31 are introduced into the slides 2, 3 in the undrilled and untapped condition, and are locked in place using screws 207 and 307.

Next, the slides 2 and 3, with their nuts, are engaged in the slideways 103 in the body 10 of the attachment and the semicircular plates 4 and 5 are attached using their attaching screws 6; the locking screws 18 and 19 are also fitted and the slides are locked in the outermost position.

Next, the drillings and tappings may be made in the nuts 21 and 31, centered and aligned exactly on the bores 14 and 15, thus ensuring that these are perfectly coaxial with the micrometer screws 12 and 13.

Then, after cleaning, the micrometer screws may be screwed into the nuts 2 and 3 as far as a position in which the grooves 121 and 131 align with the holes in the body 10 which are intended for the locking pins G, and the locking pins are driven in.

The various components can be marked so that they can be returned to their original position if ever the device is dismantled and reassembled.

Thereafter, having set the position of the cutting tools using the micrometer screws 12 and 13, the slides are locked in position by action on the two nuts or screws 18 or 19, which slightly deform the semicircular plates, which deformation is made easier by the clearances 104 formed on the face of the body thus clamping the slides in the slideway. A thinning of the plates may increase their flexibility if desired. The graduated divisions on the face of the head of the micrometer screws makes the setting easier to read. Microadjustments may also be made using a comparator showing the precise actual movement of the slides. In many instances, the attachment is preset and then mounted on the machine spindle.

If the diameter of the attachment so permits, a central bore is made, in which an additional tool may be attached, for example using one or more radial screws, not depicted.

Figure 3:
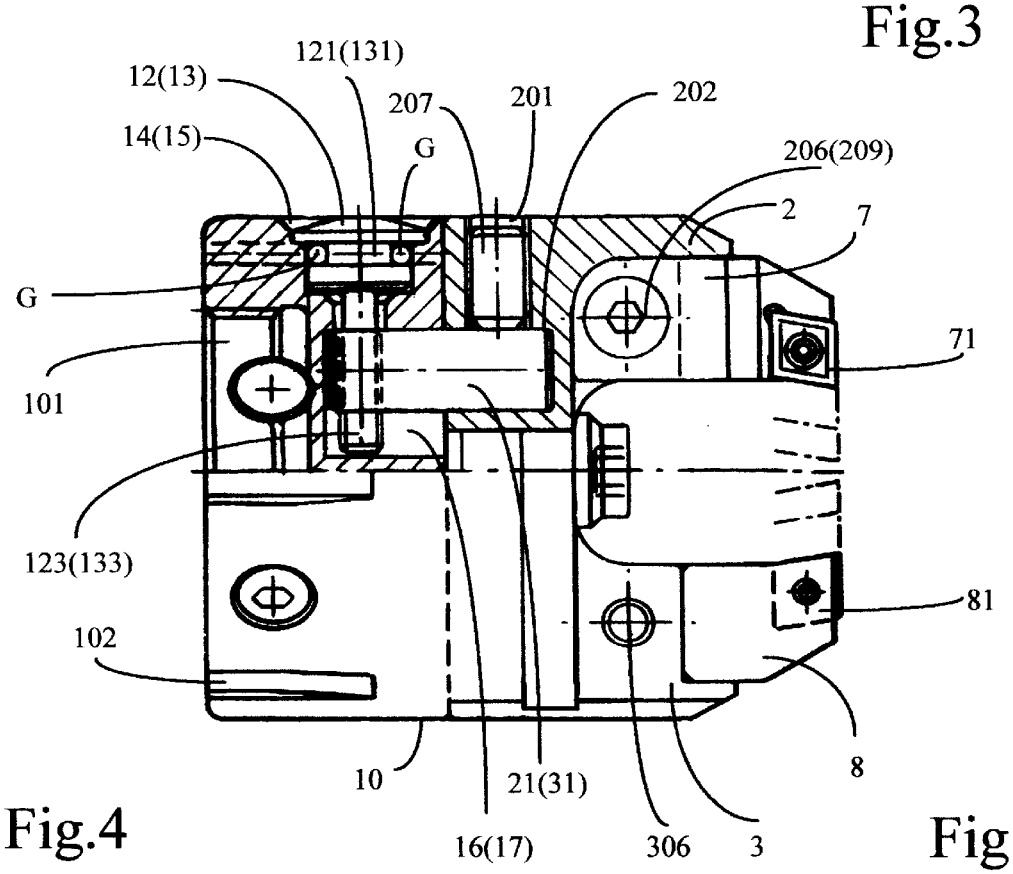
FIG. 3 is a side view partially in section of the attachment of FIG. 2 rotated through 90° about the axis of rotation.
Figure 7:
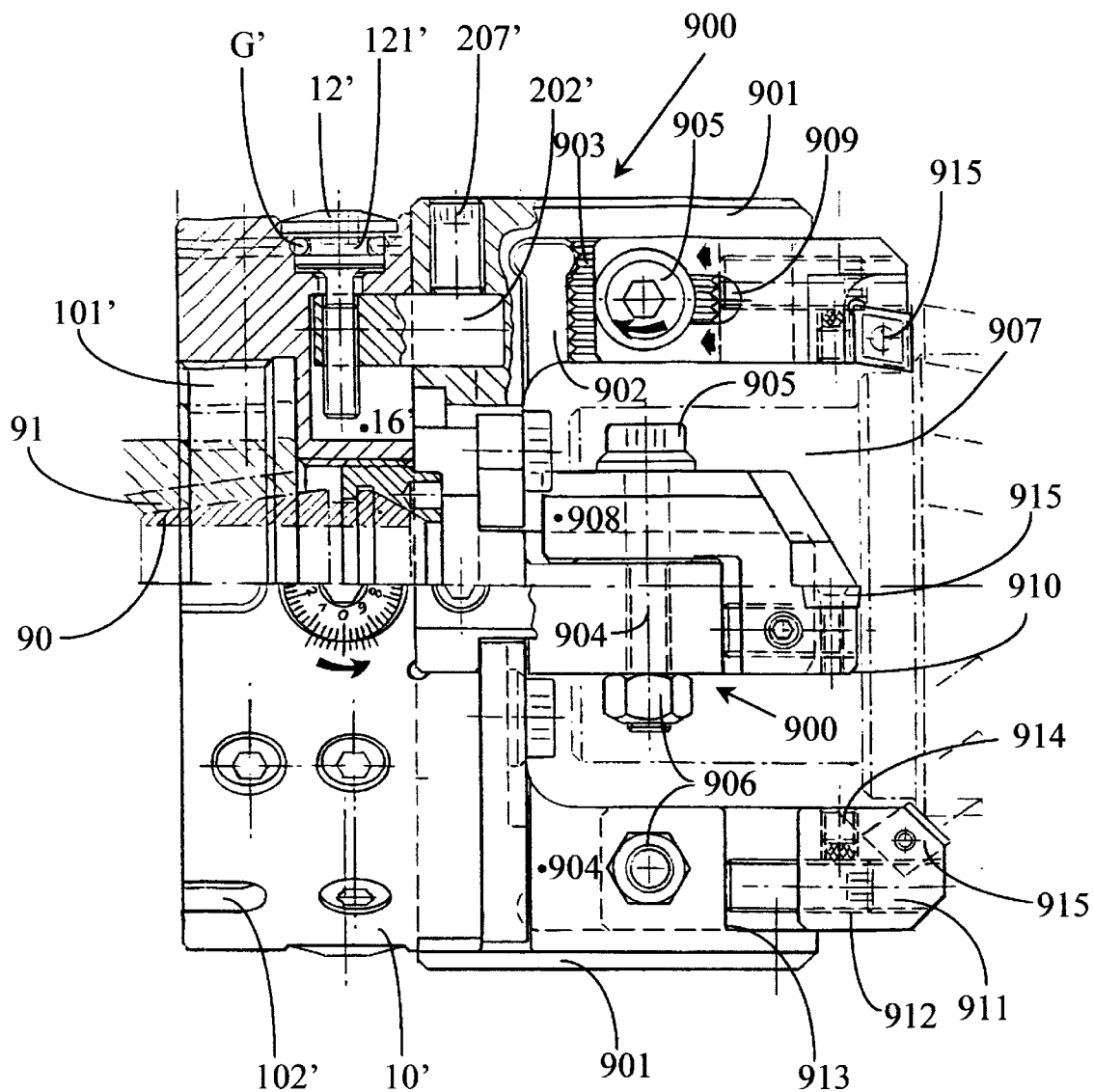
FIG. 7 is a view similar to that of FIG. 3, of an attachment with four slides.

Referring now to FIG. 7, we have depicted a turning attachment in a view similar to that of FIG. 3, except that this attachment is of far greater diameter and is equipped with four slides, three of which can be seen in this figure.

We are not going to describe the body of the attachment again, and we have merely indicated a few references which are the same as those of FIG. 3, except that they carry a prime symbol.

As regards the elements which truly differ from those of the attachment of FIG. 3, and apart from the fact that the attachment is designed for four slides, these are the slides themselves because they are equipped with means for allowing axial adjustment in addition to radial adjustment.

Another novelty is the fact that the diameter of this attachment allows a double taper collet chuck 90, fixed in a taper collet 91 of the spindle of the machine on which the attachment 10' is to be attached to be provided coaxially with the axis of said attachment. Thus, by using an appropriate nut in the body of the attachment, another cutting tool can be mounted coaxially with this attachment. This type of fitting with a double taper collet chuck 90 is known and standardized. It would also be possible to use another type of fitting if the diameter of the attachment allows this fitting to be housed coaxially with the attachment.

We now return to the description of the slide with axial adjustment. In this FIG. 7 we can see three different views of three different slides, but we are going to use the same references for the same elements on all three slides, said elements being identical even though they do not physically relate to the one same slide.

The slide referenced with the reference 900 has a head which glides in the corresponding slideway of the turning attachment and which is practically identical to the one described previously, and we shall therefore refrain from describing it. The slide has a projection for holding tools with an approximately L-shaped cross section. A first part 901 has a greater thickness and provides guidance as the tool holder moves and is of relatively narrow width, whereas another part 902 is equipped with a set of teeth 903 on one face. The toothed surface 902 of the slide 900 has passing it through it a hole 904 which may or may not be tapped depending on the size of the attachment, for the passage of a fastening screw 905. Specifically, if the dimensions of the attachment so allow, as is the case in FIG. 7, use is made of a relatively long screw at the end of which a nut 906 secures the assembly. If the dimensions do not allow the screw to extend this far and the use of the nut, the passage 904 will be tapped and the screw 905 will be screwed into said tapping.

The tool holder 907 also has the overall shape of a L, one branch 908 of which has a face for contact with the face 903 of the slide and is toothed with a complementing set of teeth to allow precise guidance. The branch bearing this toothed surface has an oblong opening 909, the dimensions of which delimit the maximum axial movement of the tool holder on the slide. The part of the second branch of the L 910 is equipped with an adjusting screw 911 housed in an axial tapping 912 (with respect to the axis of the head of the slide) and this screw butts against a surface 913 perpendicular to the set of teeth 903. This screw 911 is self-locking by means of a screw 914 arranged in a tapped housing perpendicular to the housing 912.

The cutting tool 915 is attached to the end of the tool holder by conventional means. When the axial movement of the tool holder is being adjusted, the screw 905 is slackened and the screw 911 is used to place the tool holder in the desired position in such a way that the screw 911 butts against the surface 913 of the slide, then the screw 905 is tightened again in the direction of the arrow as shown in the figure, to obtain an assembly which is as compact and rigid as possible.

According to a preferred alternative form, the outer surface of the leg 908 of the tool holder is slightly inclined so that when the screw 905 is tightened the tool holder is pushed axially toward the clamping head, which makes sure that the tool holder presses against the slide, via the axial adjusting screw 911 of course, thus increasing the rigidity of the assembly and improving the precision of the axial setting because that eliminates any risk of backward movement of the tool holder with respect to the slide while the transverse attaching screw is being locked.

What is claimed is:

1. A rotary turning attachment with at least two tools, comprising
   (a) a cylindrical body intended to be mounted on a spindle of a machine tool and having a lateral surface and an axis of rotation;
   (b) at least two slides that move radially with respect to the axis of rotation of said cylindrical body, each of the slides being secured to a removable tool holder, wherein the cylindrical body comprises, on one plane face, one slideway per slide, formed in a recess running along a radius of said plane face allowing the slide to move;
   (c) at least two plates attached removable to said face of the body, so as to hold the slides in the respective slideway in the direction of the axis of rotation of the turning attachment; said attachment comprises at least two cylindrical housings, each running from the lateral surface of the cylindrical body inward, parallel to said slideway, said cylindrical housings being designed to receive a micrometer screw each of which controls the individual movement of one slide; and said cylindrical housings each open into a housing of larger dimensions communicating with the corresponding slideway, the latter housing allowing a nut secured to a slide to be housed and moved therein, and a threaded part of the micrometer screw being engaged in said nut.

2. The turning attachment as claimed in claim 1, wherein the body is equipped with a bore that is concentric with the axis of the body and intended for the attaching of another tool.

3. The attachment as claimed in claim 2, wherein a taper nut is housed in the concentric bore and, in collaboration with a taper collet placed in the spindle of the machine on which the attachment is mounted, allows a tool to be attached coaxially with the attachment using double taper collet chucks.

4. The attachment as claimed in claim 1, wherein the body is equipped with means for locking the slides after they have been adjusted, said means consisting in one locking screw per slide each acting on one of the plates so as to lock the slide in place by deformation of said plate after said screws have been tightened, in accordance with the clearances formed on the body of the attachment.

5. The attachment as claimed in claim 2, wherein the body is equipped with means for locking the slides after they have been adjusted, said means consisting in one locking screw per slide each acting on one of the plates so as to lock the slide in place by deformation of said plate after said screws have been tightened, in accordance with the clearances formed on the body of the attachment.

6. The attachment as claimed in claim 3, wherein the body is equipped with means for locking the slides after they have been adjusted, said means consisting in one locking screw per slide each acting on one of the plates so as to lock the slide in place by deformation of said plate after said screws have been tightened, in accordance with the clearances formed on the body of the attachment.

7. The turning attachment as claimed in one of claims 1 to 4 or 5 to 6, wherein the micrometer screws are locked in place in their respective housing using two pins engaged in a groove located near to the micrometer screw head.

8. The attachment as claimed in one of claims 1 to 4 or 5 to 6, wherein the slides allow axial adjustment of the tool supported by a tool holder.

9. The attachment as claimed in claim 8, wherein each slide is equipped on one face with a set of teeth intended to collaborate with a mating set of teeth belonging to one face of the tool holder, and said face of the tool holder has an oblong opening running axially through which a member for attaching the tool holder to the slide passes.

10. The attachment as claimed in claim 9, wherein the tool holder is equipped with a member for axial adjustment acting parallel to the direction of adjustment by pressing against a surface of the slide perpendicular to said direction of adjustment.

11. The attachment as claimed in claim 10, wherein the member for attaching is an attachment screw, and the surface of the tool holder against which the head of said attachment screw presses is inclined so that upon tightening, the tool holder is clamped against the surface of the slide via the member for axial adjustment also.

12. The attachment as claimed in claim 9, wherein the member for attaching is an attachment screw, and the surface of the tool holder against which the head of said attachment screw presses is inclined so that upon tightening, the tool holder is clamped against the surface of the slide via the member for axial adjustment also.

* * * * *